(12) United States Patent
O'Neill et al.

(10) Patent No.: US 10,920,892 B2
(45) Date of Patent: Feb. 16, 2021

(54) ADAPTER FOR CONNECTING TUBING WITH PUSH-FIT FITTINGS

(71) Applicant: Accor Technology, Inc., Kirkland, WA (US)

(72) Inventors: Jerry Edward O'Neill, Kirkland, WA (US); Charlie E. Whitney, East Wenatchee, WA (US)

(73) Assignee: Accor Technology, Inc., Kirkland, WA (US)

( * ) Notice: Subject to any disclaimer, the term of this patent is extended or adjusted under 35 U.S.C. 154(b) by 107 days.

(21) Appl. No.: 16/134,620

(22) Filed: Sep. 18, 2018

(65) Prior Publication Data

US 2020/0088304 A1   Mar. 19, 2020

(51) Int. Cl.
*F16K 1/32* (2006.01)

(52) U.S. Cl.
CPC ..................................... *F16K 1/32* (2013.01)

(58) Field of Classification Search
CPC .............................. F16K 1/32; Y10T 137/6065
See application file for complete search history.

(56) References Cited

U.S. PATENT DOCUMENTS

| | | |
|---|---|---|
| 1,440,207 A | 12/1922 | Burns |
| 2,158,757 A | 5/1939 | Kuestermeier |
| 2,484,192 A | 10/1949 | Squiller |
| 2,840,395 A | 6/1958 | Tarnow |
| 3,135,033 A | 6/1964 | Jackson |
| 3,204,988 A | 9/1965 | Ouderkirk et al. |
| 3,312,484 A | 4/1967 | Davenport |
| 3,429,596 A | 2/1969 | Marshall |
| 3,429,598 A | 2/1969 | Marshall |
| 3,837,687 A | 9/1974 | Leonard |
| 3,874,709 A | 4/1975 | MacDonald |
| 3,995,897 A | 12/1976 | Paskert |
| 4,059,297 A | 11/1977 | Grahl et al. |
| 4,062,574 A | 12/1977 | Scholin |
| 4,073,514 A | 2/1978 | Pate |

(Continued)

FOREIGN PATENT DOCUMENTS

| | | |
|---|---|---|
| DE | 9415532 | 2/1995 |
| EP | 602498 | 6/1994 |

(Continued)

*Primary Examiner* — Kevin R Barss
(74) *Attorney, Agent, or Firm* — Davis Wright Tremaine LLP; George C. Rondeau, Jr.

(57) ABSTRACT

A valve and adapter for coupling a tubing to the valve. The adapter has first and second adapter end portion with connected fluid passageways. The second adapter end portion being insertable into the free-end portion of the tubing. A valve housing has a first chamber sized to receive the first adapter end portion and a second chamber has inward and outward fluid ports. When the first adapter end portion is positioned within the first chamber, an outer end portion of its fluid passageway is in fluid communication with the inward fluid port of the second chamber. A seal and gripper ring within the first chamber seal with and releasably grip the first adapter end portion. A valve element selectively control fluid flow between the first and second fluid passageways. The adapter may be used with a test cap and other fittings which include a seal and a gripper ring.

29 Claims, 9 Drawing Sheets

(56) References Cited

U.S. PATENT DOCUMENTS

| | | |
|---|---|---|
| 4,084,843 A | 4/1978 | Gassert |
| 4,099,749 A | 7/1978 | van Vliet |
| 4,124,235 A | 11/1978 | Grahl et al. |
| 4,146,254 A | 3/1979 | Turner et al. |
| 4,181,329 A | 1/1980 | Helm |
| 4,288,113 A | 9/1981 | Saulnier |
| 4,324,407 A | 4/1982 | Upham et al. |
| 4,390,159 A | 6/1983 | Duncan |
| 4,490,576 A | 12/1984 | Bolante et al. |
| 4,508,369 A | 4/1985 | Mode |
| 4,586,734 A | 5/1986 | Grenier |
| 4,593,943 A | 6/1986 | Hama et al. |
| 4,613,172 A | 9/1986 | Schattmaier |
| 4,632,437 A | 12/1986 | Robson et al. |
| 4,635,975 A | 1/1987 | Campbell |
| 4,645,245 A | 2/1987 | Cunningham |
| 4,655,486 A | 4/1987 | Tamay et al. |
| 4,676,533 A | 6/1987 | Gerondale |
| 4,717,179 A | 1/1988 | Haberstock et al. |
| 4,722,558 A | 2/1988 | Badoureaux |
| 4,747,626 A | 5/1988 | Hama et al. |
| 4,749,214 A | 6/1988 | Hoskins et al. |
| 4,777,669 A | 10/1988 | Rogus |
| 4,875,709 A | 10/1989 | Carroll et al. |
| 4,890,865 A | 1/1990 | Hosono et al. |
| 4,911,406 A | 3/1990 | Atwood |
| 5,052,723 A | 10/1991 | Bartholomew |
| 5,094,467 A | 3/1992 | Lagabe |
| 5,160,179 A | 11/1992 | Takagi |
| 5,174,331 A | 12/1992 | Steudler |
| 5,205,568 A | 4/1993 | Stoll et al. |
| 5,439,258 A | 8/1995 | Yates |
| 5,496,076 A | 3/1996 | Lin |
| 5,527,073 A | 6/1996 | Readman |
| 5,553,901 A | 9/1996 | Serot |
| 5,621,191 A | 4/1997 | Norris et al. |
| 5,681,062 A | 11/1997 | Fukao et al. |
| 5,695,224 A | 12/1997 | Grenier |
| 5,722,702 A | 3/1998 | Washburn |
| 5,782,570 A | 7/1998 | Masterson et al. |
| 5,799,985 A | 9/1998 | Murphy |
| 6,347,785 B1 | 2/2002 | Copp et al. |
| 6,464,266 B1 | 10/2002 | O'Neill et al. |
| 6,663,145 B1 | 12/2003 | Lyall, III et al. |
| 6,685,230 B1 | 2/2004 | Bottura |
| 6,783,161 B2 | 8/2004 | Halama |
| 6,860,523 B2 | 3/2005 | O'Neill et al. |
| 7,232,159 B2 | 6/2007 | O'Neill et al. |
| 7,523,966 B2 | 4/2009 | O'Neill et al. |
| 7,717,475 B2 * | 5/2010 | Savelle, Jr. ............. F16L 33/24 285/179 |
| 7,810,850 B2 | 10/2010 | O'Neill et al. |
| 8,820,799 B2 | 9/2014 | O'Neill et al. |
| 9,322,499 B2 | 4/2016 | Guest |
| 2003/0067170 A1 | 4/2003 | Snyder, Sr. et al. |
| 2003/0116960 A1 | 6/2003 | Yates |
| 2004/0021318 A1 | 2/2004 | Fritze et al. |
| 2004/0070198 A1 | 4/2004 | Rohrig |
| 2004/0155464 A1 | 8/2004 | Slattsveen |
| 2004/0239115 A1 | 12/2004 | Wilk, Jr. et al. |
| 2006/0208213 A1 | 9/2006 | Turnau et al. |
| 2012/0247513 A1 | 10/2012 | Johnson |
| 2014/0311614 A1 | 10/2014 | Edmondson et al. |
| 2015/0076816 A1 | 3/2015 | O'Neill et al. |
| 2015/0159794 A1 | 6/2015 | Bobo et al. |
| 2015/0240571 A1 | 8/2015 | Bowles |

FOREIGN PATENT DOCUMENTS

| | | | |
|---|---|---|---|
| EP | 610538 | 8/1994 | |
| GB | 1520150 | 8/1978 | |
| GB | 2280006 | 1/1995 | |
| GB | 2390882 B | 9/2005 | |
| GB | 2505420 A | 3/2014 | |
| WO | 97/00314 | 1/1997 | |
| WO | WO-0036327 A1 * | 6/2000 | ....... B29C 66/52292 |
| WO | 2010136606 A1 | 12/2010 | |

* cited by examiner

ADAPTER FOR CONNECTING TUBING WITH PUSH-FIT FITTINGS

BACKGROUND OF THE INVENTION

Field of the Invention

The present invention is directed generally to an adapter which is usable in combination with a push-fit type fittings, such as a supply stop valve or other style valve or fitting, to permit either the connection of a pipe to the push-fit valve using a push-fit connection or the connection of a tubing, such as PEX and PE-RT tubing, to the push-fit valve using an expansion or crimp connection.

Description of the Related Art

As is apparent to those of ordinary skill in the art, push-fit fittings such as valves, for example, a supply stop valves, typically have an input port with gripper rings to receive a water supply pipe to accomplish a push-fit connection to the pipe and an output port to which a standard flexible hose is connected such that water passing through the supply stop valve is delivered to a water tank of a toilet, a washing machine, an ice maker, a dishwasher or other appliance or equipment. It is now common to supply pressurized water using tubing such as PEX and PE-RT tubing. Often, fittings are attached to the tubing using an expansion or crimp connection. However, using a push-fit connection with tubing provides certain benefits. Many push-fit connections to tubing require use of a stiffener sleeve inserted within the tubing for proper gripping by the gripper rings of the push-fit fitting and a good seal by the O-ring of the fitting. Use of such a stiffener sleeve increased the cost and time to install the push-fit fitting coupling on the tubing.

Current plumbing systems may use rigid pipe or tubing, and this necessitates manufacture of several different style supply stop valves, including ones with a push-fit input port, ones with an expansion input port for PEX and PE-RT tubing, and ones with a crimp input port for PEX and PE-RT tubing. Further, installers must have a supply of all types of supply stop valves on hand to accommodate the particular plumbing system for which they are to be used, despite the fact that other than their input ports the basic supply stop valve and output port portions are identical.

In view of the above, and for other reasons noted herein, a need exists for an adapter suitable for use with push-fit fittings such that the fitting may be used in a normal manner where the gripper rings grip the outer diameter of the rigid pipe or tubing without the use of an adapter and may be used with tubing such as PEX and PE-RT tubing when the adapter is used to make an expansion or crimp connection.

BRIEF DESCRIPTION OF THE SEVERAL VIEWS OF THE DRAWING(S)

Like reference numerals have been used in the figures to identify like components.

DETAILED DESCRIPTION OF THE INVENTION

Figure 1:
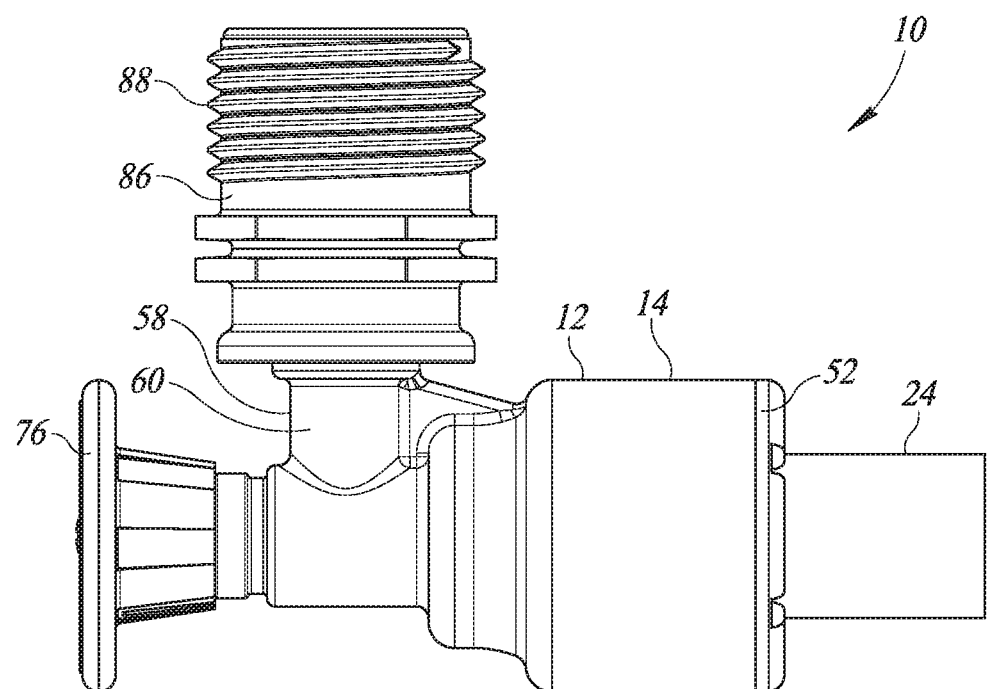
FIG. 1 is a side elevational view of a conventional push-fit valve usable with the present invention.
Figure 2:
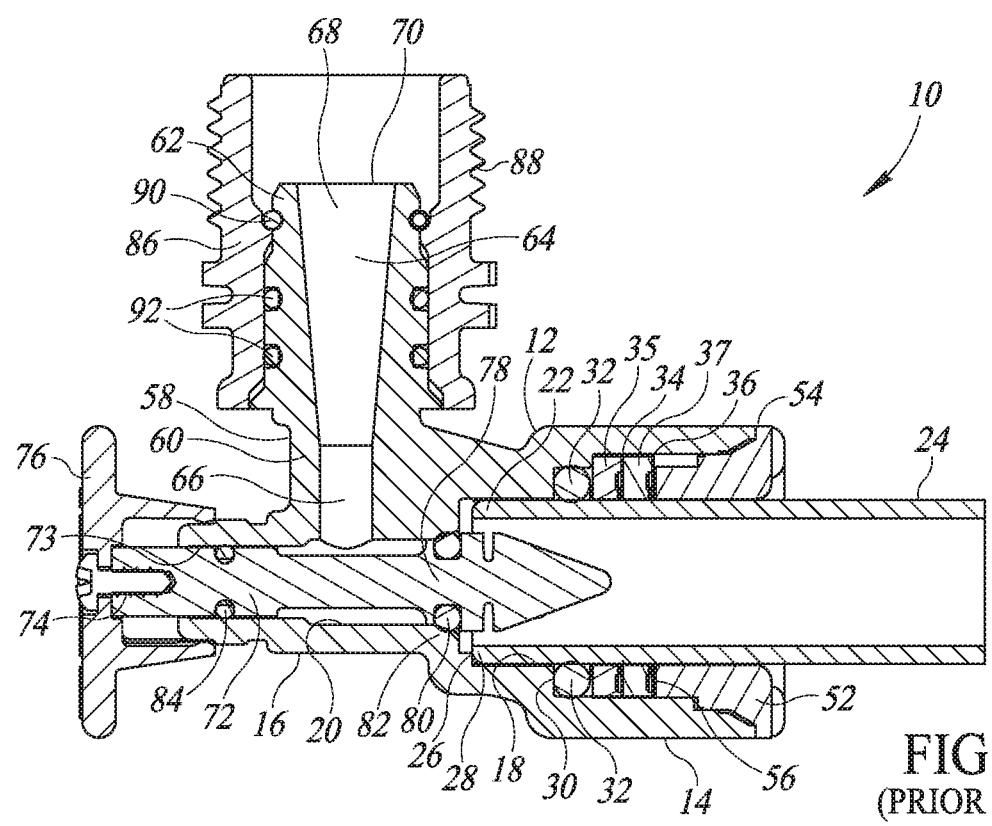
FIG. 2 is a cross-section side elevational view of the valve of FIG. 1.

FIGS. 1 and 2 illustrates a conventional push-fit type valve 10, in particular a supply stop valve, although the present invention may comprise other styles of push-fit-fit valves, push-fit couplers, and other push-fit fittings. The basic construction and operation of push-fit-fit type fittings are described in U.S. Pat. Nos. 4,911,406 and 6,464,266, which are incorporated herein in their entireties.

As best seen in FIG. 2, in the embodiment of the push-fit-fit valve 10 illustrated, the valve has a housing 12 with a first housing portion 14 and a second housing portion 16 in coaxial arrangement. The first housing portion 14 has a first axial chamber or bore 18 and the second housing portion 16 has a second axial chamber or bore 20 in coaxial arrangement with the first axial bore. The inward end portion of the first axial bore 18 is in fluid communication with the inward end portion of the second axial bore 20. The outer end portions of the first axial bore 18 and the second axial bore 20 are open. The first axial bore 18 is sized to receive therein, through the open outer end portion of the first axial bore, a pipe free-end portion 22 of a smooth outer walled pipe 24. At the inward end portion of the first axial bore 18 there is an inward first shoulder 26 sized to engage an outer end wall 28 of the pipe free-end portion when inserted fully into the first axial bore to limit inward movement of the pipe. The first axial bore 18 further includes a second shoulder 30 positioned outward of the first shoulder 26 at which an O-ring 32 is positioned. The second shoulder 30 holds the O-ring 32 against inward movement. The O-ring 32 is sized to receive the pipe free-end portion 22 therethrough and provide a fluid-tight seal between the outer wall of the pipe free-end portion and the inner wall of the first axial bore 18.

Figure 3:
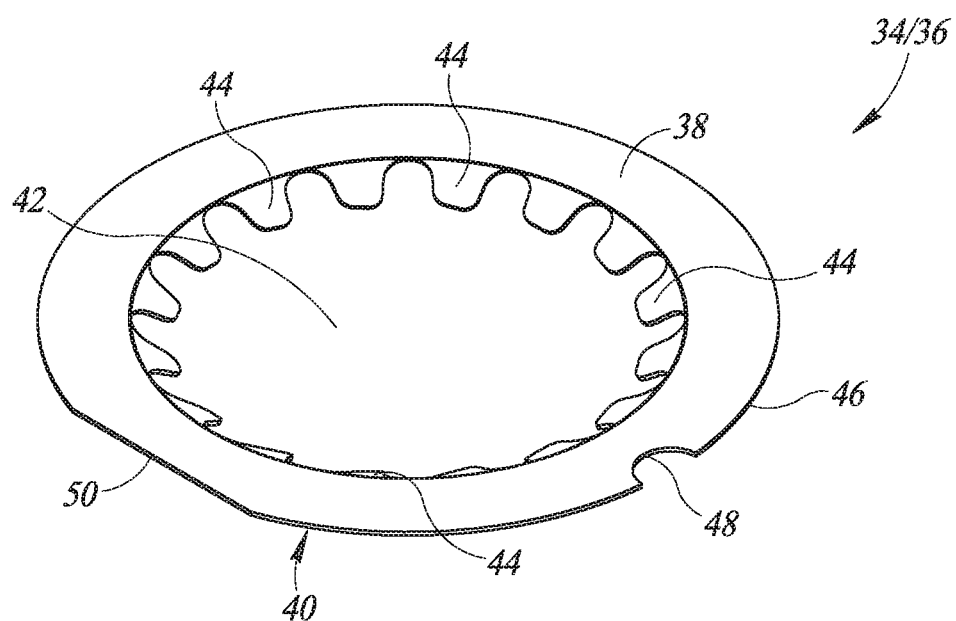
FIG. 3 is a top perspective view of a gripper ring used with the valve of FIG. 1.

A first gripper ring 34 and a first spacer bushing 35 are positioned outward of the O-ring 32, and a second gripper ring 36 and a second spacer bushing 37 are positioned outward of the first gripper ring and first gripper ring bushing. As best seen in FIG. 3, each of the first and second gripper rings 34 and 36 includes outward and inward facing circumferentially extending smooth perimeter wall portions 38 and 40, respectively, having a central through-hole 42 through which the pipe free-end portion 22 may be inserted and a plurality of circumferentially spaced, axially and radially inwardly protruding teeth 44 that extend into the central through-hole and grip the pipe free-end portion 22 when inserted therein. The teeth 44 grip the pipe free-end portion 22 to prevent its unintentional withdrawal during use. An outer circumferential edge wall 46 of each of the first and second gripper rings 34 and 36 may include one or more keyways 48 and 50 to engage longitudinally extending keys (not shown) on the inner wall of the first axial bore 18 to prevent rotation of the gripper ring within the first axial bore. The gripper rings are made of metal and the teeth 44 may each be provided with a twist in a common direction such that the forward most edge of the teeth is bent at an angle to allow the pipe free-end portion 22 of the pipe 24 to be slid past the sharp edges of the ends of the teeth for easy insertion into the first axial bore 18 past the first and second gripper rings 34 and 36 and the O-ring 32. The teeth 44 will bite into the tubular conduit to prevent its retraction a straight line (i.e., without twisting) and hence securely hold the pipe free-end portion 22 within the first axial bore during normal usage of the valve 10. However, the bent teeth 44 permit the pipe free-end portion 22 to be easily removed from the first axial bore 18 by rotating the pipe free-end portion to effectively unscrewing from the valve 10.

Figure 4:
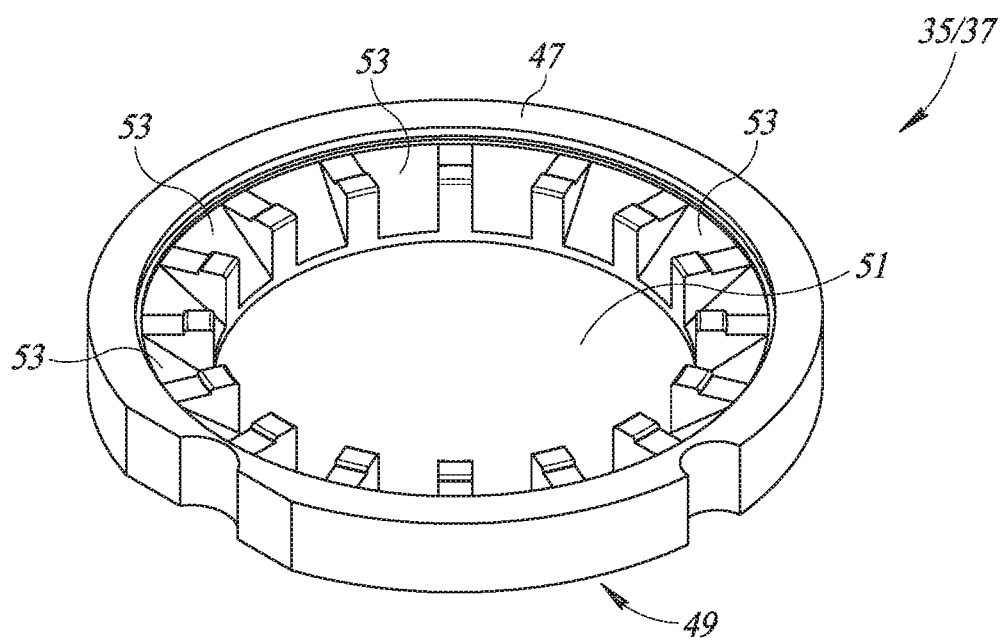
FIG. 4 is a top perspective view of a spacer bushing used with the valve of FIG. 1.

As best seen in FIG. 4, each of the first and second spacer bushings 35 and 37 has includes outward and inward facing circumferentially extending smooth perimeter wall portions 47 and 49, respectively, and a central through-hole 51 through which the pipe free-end portion 22 may be inserted. Each spacer bushing further includes circumferentially spaced axial grooves 53, each with one of the circumferentially spaced teeth 44 of the gripper ring positioned therein.

Figure 4A:
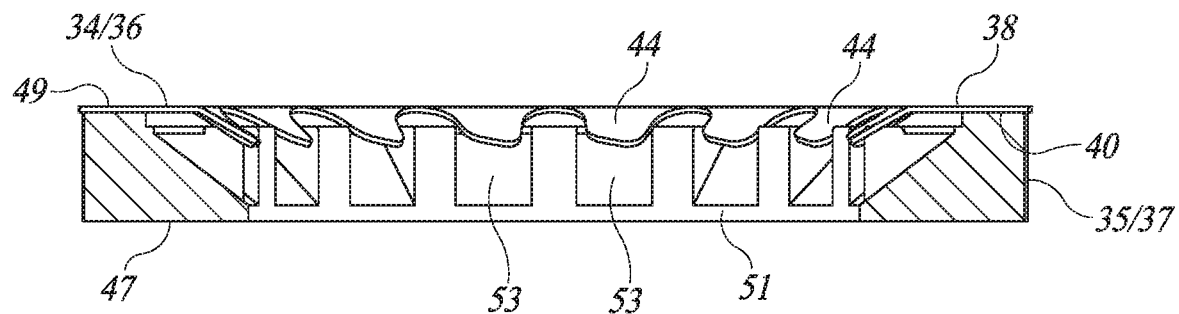
FIG. 4A is a cross-sectional side elevational view of the spacer bushing of FIG. 4 assembled with the gripper ring of FIG. 3, for use in the valve of FIG. 1.

FIG. 4A shows one of the first and second gripper rings 34/35 assembled with the corresponding one of the first and second spacer bushings 35/37. As best seen in FIGS. 2 and 4A, the inward facing perimeter wall portion 49 of the first spacer bushing 35 is in seated engagement with the O-ring 32 and the inward perimeter wall portion 49 of the second spacer bushing 37 is in seated engagement with the outward facing perimeter wall portion 38 of the first gripper ring 34.

It is to be understood that the valve 10 may use more than a single O-ring and use a single gripper ring or more than two gripper rings to achieve the desired seal with and grip on the pipe free-end portion 22. Further, the O-rings and gripper rings may be in different sequential positions within the first axial bore 18.

Again referring to FIGS. 1 and 2, an end bushing 52 is positioned in an open end portion 54 of the first axial bore 18 and secured to the first housing portion 14 to retain the O-ring 32 and the first and second gripper rings 34 and 36 within the first axial bore 18. The end bushing 52 extends inward of the axial bore 18 sufficiently that an inward end portion 56 of the end bushing engages the outer perimeter wall portion 40 of the second gripper ring 36 to hold the O-ring 32, the first and second gripper rings 34 and 36, and the first and second spacer bushings 35 and 37 tightly sandwiched together between the first shoulder 26 and the inward end portion 56 of the end bushing 52. The end bushing 52 may be secured to the first housing portion 14 by an adhesive, sonic welding, a threaded attachment or any other suitable manners of connection. An O-ring may be used between the end bushing 52 and the first housing portion 14 if desired or necessary to create a fluid-tight seal therebetween.

A third housing portion 58 has an inward end portion 60 and an outward end portion 62, and a fluid channel 64 extending fully therethrough. The fluid channel 64 has an inward end channel portion 66 in fluid communication with the second axial bore 20 of the second housing portion 16, at a midportion of the second housing portion, and an outward end channel portion 68 terminating with a output fluid port 70. The third housing portion 58 is arranged perpendicular to the axially aligned first and second housing portions 14 and 16, but it is to be understood that other arrangements of the housing portions is possible. Further, while the first, second and third housing portions 14, 16 and 58 of the housing 12 are formed as an integral unit, it is to be understood that the housing portions may be formed as separate component temporarily or permanently connected together for use.

The valve 10 utilizes a valve element which includes a valve stem 72 axially movable within the second housing portion 16 between a valve opened position and a valve closed position. The valve stem 72 extend outward of the second housing portion 16 through a second housing portion opening 73 and has an outer end portion 74 positioned outward of the second housing portion with an actuator 76, also comprising part of the valve element, attached thereto which is grippable by a user to manually move the valve stem between the valve opened and valve closed positions. An inward end 78 of the valve stem 72 is positioned within the second housing portion 16 and has a first valve stem O-ring 80 mounted thereon which acts as a stopper and is part of the valve element, at a location inward of the inward end channel portion 66 of the fluid channel 64, for axial movement with the valve stem. When the valve stem 72 is pulled sufficiently outward by the actuator 76 into the valve closed position shown in FIG. 2, the first valve stem O-ring 80 is moved into sealingly engagement with a valve seat 82 formed on the inner wall of the second axial bore 20. A second valve stem O-ring 84 is mounted on the valve stem at a location outward of the inward end channel portion 66 of the fluid channel 64, for axial movement with the valve stem. The second valve stem O-ring 84 provides a fluid-tight seal between the valve stem 72 and the inner wall of the second housing portion 16 when the valve stem is in the valve opened position and a valve closed position, and all positions therebetween to prevent escape of fluid out of the second housing portion at the outward end thereof.

When the valve stem 72 is pushed sufficiently inward by the actuator 76 into the valve opened position (not shown), the first valve stem O-ring 80 is moved out of sealingly engagement with the valve seat 82, thereby permitting fluid communication between the inward ends of the first and second axial bores 18 and 20 of the first and second housing portions 14 and 16. This allows the flow of fluid provided by the pipe 24 to flow to the inward end channel portion 66 of the fluid channel 64 for exit out of the outward end channel portion 68 through the output fluid port 70 of the third housing portion 58.

While the valve 10 is described as having a push-pull type operation, it is to be understood that other types of opening and closing mechanisms may be utilized, such as a quarter turn style valve mechanism.

A connector 86 having an exteriorly threaded portion 88 is coaxially and rotatably mounted on the outward end portion 62 of the third housing portion 58. This is useful in washing machine valves for making a connection to a typical flexible washing machine water supply hose (hot shown). One end of the hose is typically threadably attached to the connector 86 and the other end of the utility hose is attached to the fluid supply port of a fixture (not shown), such as a washing machine. A split stop ring 90 prevents removal of the connector 86 from the third housing portion 58, but allows its rotation relative thereto. A pair of O-rings 92 are mounted on the outer wall of the outward end portion 62 of the third housing portion 58 to provide a fluid-tight seal between the outer wall of the outward end portion 62 and the inner wall of the connector 86. Other connectors or direct connection to the outward end portion 62 of the third housing portions 58 such as by threads formed on the outward end portion may be used for connections of the valve 10 to a water tank of a toilet, an ice maker, a dishwasher or other plumbing fixtures or equipment.

Figure 9:
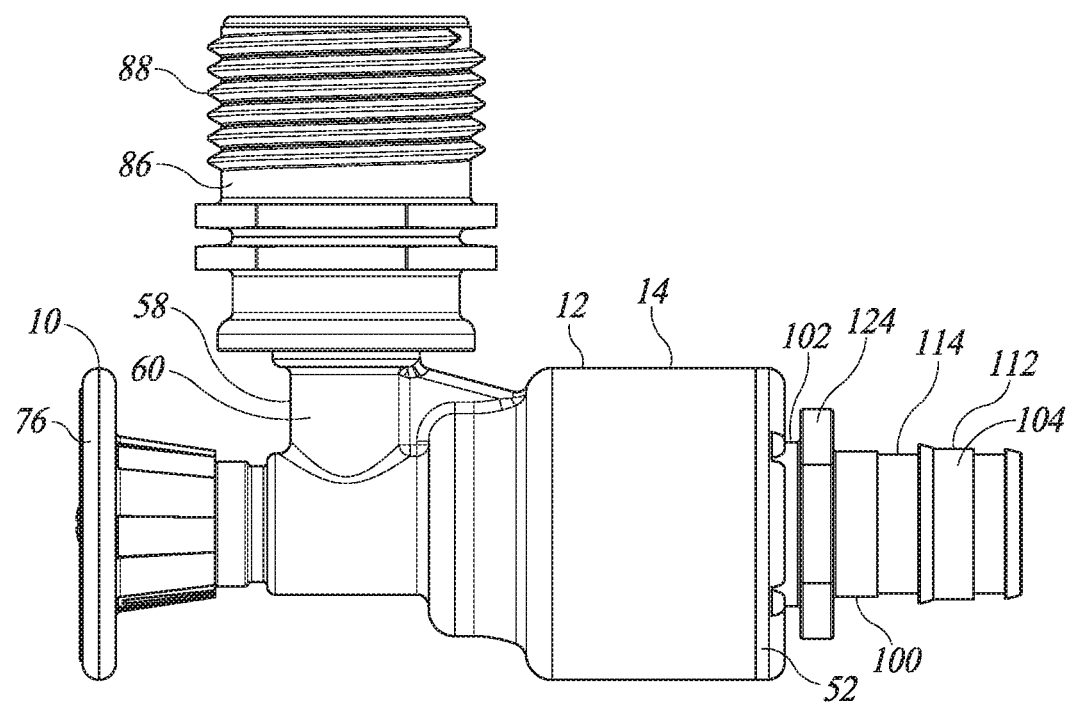
FIG. 9 is a side elevational view of the adapter of FIG. 5 used in combination with the valve of FIG. 1.
Figure 10:
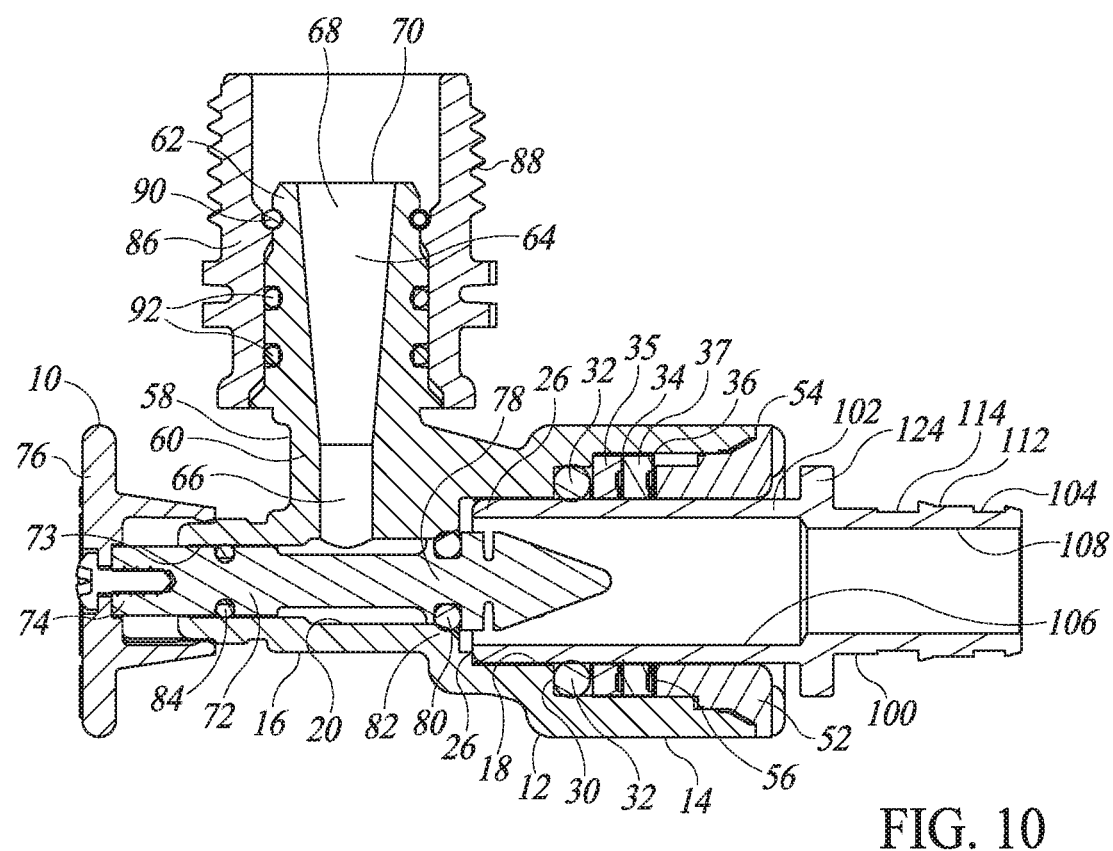
FIG. 10 is a cross-section side elevational view of the adapter of FIG. 5 used in combination with the valve of FIG. 1.
Figure 11:
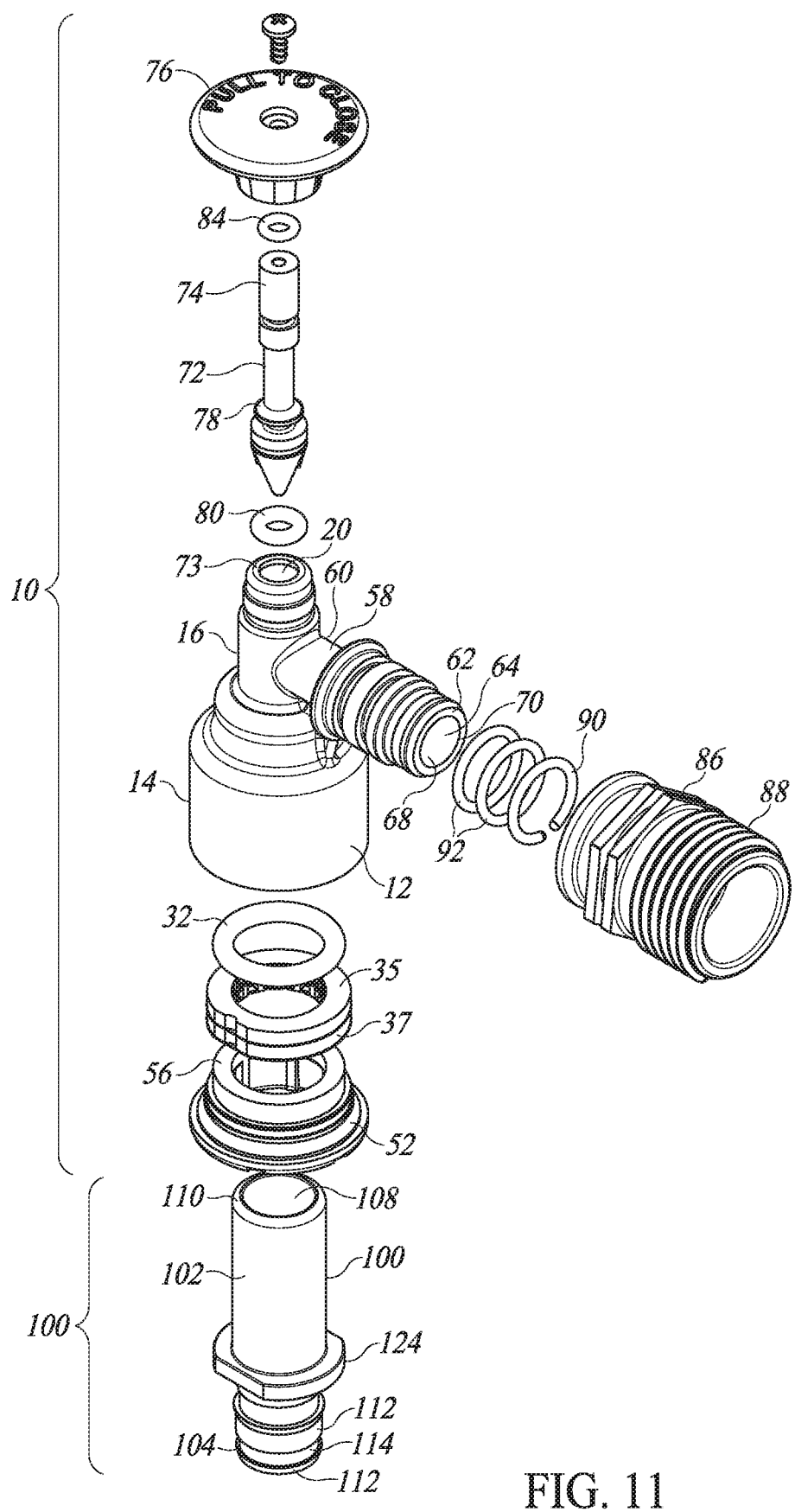
FIG. 11 is an exploded view of the adapter of FIG. 5 used in combination with the valve of FIG. 1.

FIGS. 5-8 shows an adapter 100 according to the present invention usable together with the conventional push-fit type valve of FIG. 1 and other styles of push-fit type valves and fitting, and both by itself and in combination with a push-fit type valve or fitting, such as the push-fit type valve of FIG. 1, comprises the present invention. FIGS. 9-11 show the push-fit valve 10 and adapter 100 combination.

The adapter 100 has an elongated first adapter end portion 102 and a second adapter end portion 104 in coaxial alignment with the first adapter end portion. The first adapter end portion 102 has a first adapter axial fluid passageway or bore 106 therethrough and the second adapter end portion 104 has a second adapter axial fluid passageway or bore 108 therethrough in coaxial arrangement with the first adapter axial bore. The inward end of the first adapter axial bore 106 is in fluid communication with the inward end of the second adapter axial bore 108. The outer ends of the first adapter axial bore 106 and the second adapter axial bore 108 are open.

The first adapter end portion 102 has the shape of a segment of cylindrical, smooth outer walled pipe much like the pipe free-end portion 22 of the pipe 24. The first adapter end portion 102 has an outer diameter sized to be inserted into the open end portion 54 of the first axial bore 18 of the first housing portion 14 and through the central throughholes 42 of the first and second gripper rings 34 and 35 and the through the O-ring 32, so as to be sufficiently engaged by their teeth 44 to securely hold the first adapter end portion within the first axial bore 18 during normal usage of the valve 10. The outer diameter of the first adapter end portion 102 is sized such that when extending through the O-ring 32, the O-ring provides a fluid-tight seal between the outer wall of the first adapter end portion and the inner wall of the first axial bore 18.

The first adapter end portion 102 has a length such that an outer end wall 110 of the first adapter end portion engages the first shoulder 26 of the first axial bore 18 when inserted fully into the first axial bore which limits further inward movement of the first adapter end portion and positions the first adapter end portion in engagement with the teeth 44 of the first and second gripper rings 34 and 35 while extending through the O-ring 32. In such manner, the first adapter end portion 102 is secured within the first axial bore 18 by the gripper rings 34 and 35 and the O-ring 32 provides a fluid-tight seal between the outer wall of the first adapter end portion and the inner wall of the first axial bore 18, much like described above for the pipe free-end portion 22 when inserted fully into the first axial bore.

Figure 5:
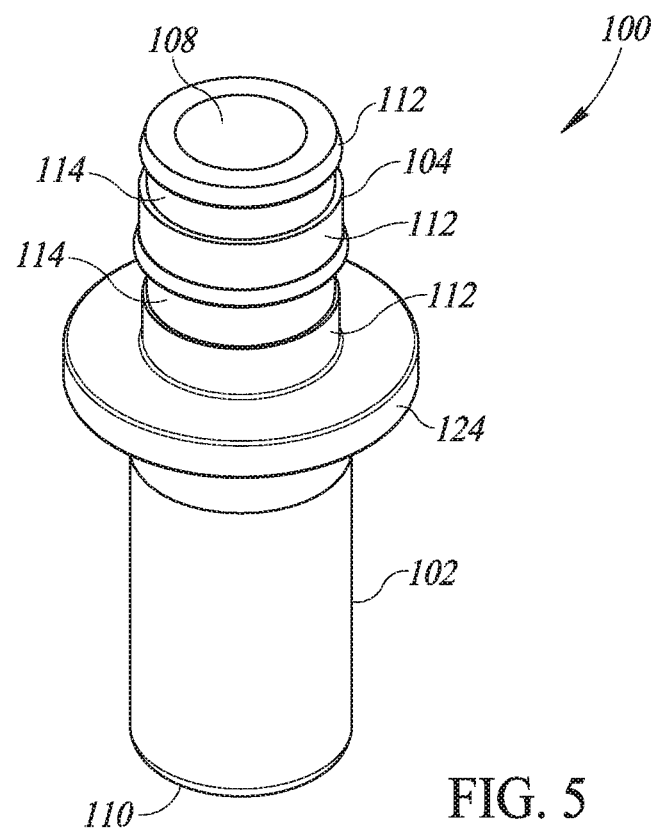
FIG. 5 is a top perspective view of an adapter usable with the valve of FIG. 1.
Figure 5A:
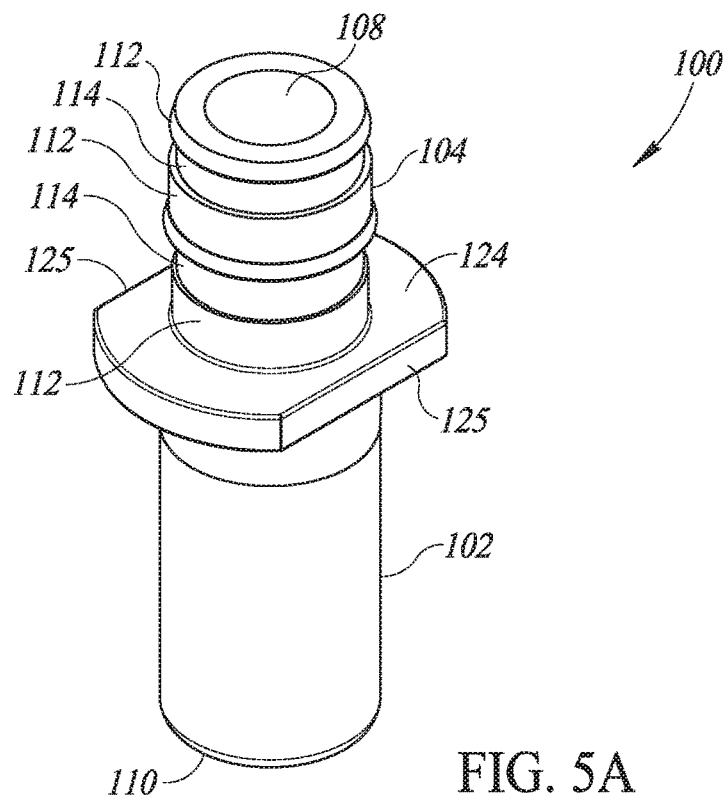
FIG. 5A is a top perspective view of the adapter of FIG. 5 with wrench flats.
Figure 6:
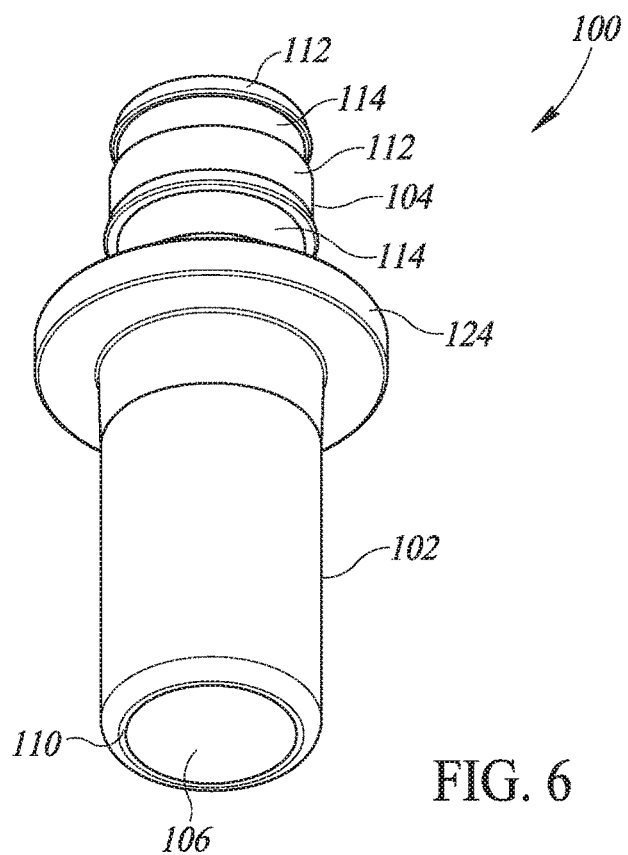
FIG. 6 is a bottom perspective view of the adapter of FIG. 5.
Figure 7:
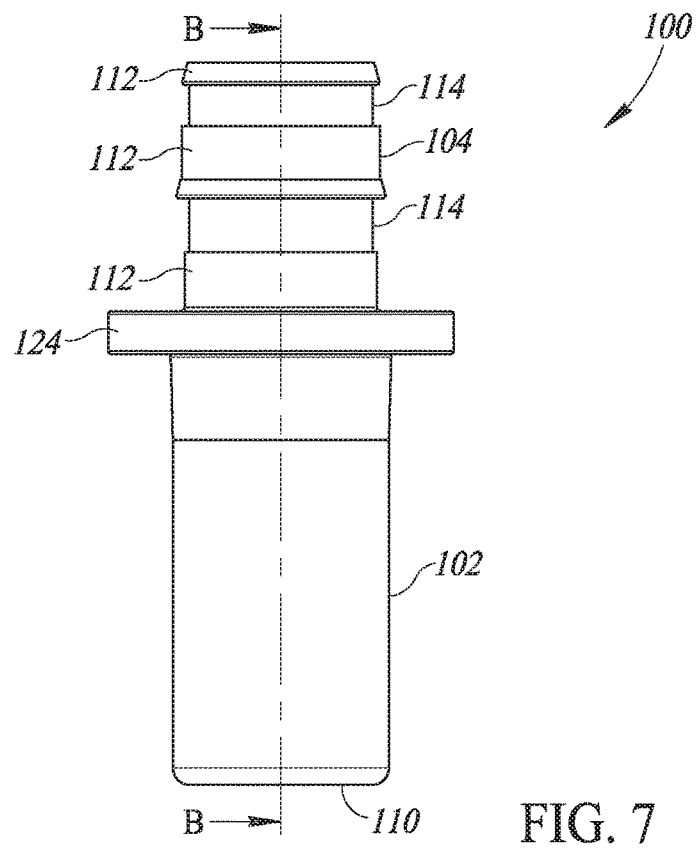
FIG. 7 is a side elevational view of the adapter of FIG. 5.
Figure 8:
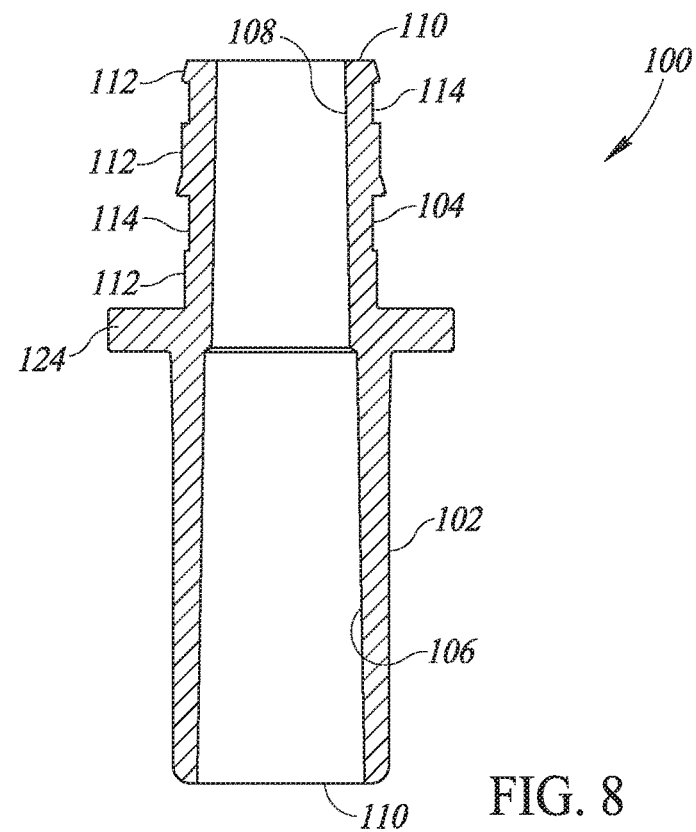
FIG. 8 is a cross-sectional view of the adapter of FIG. 5.
Figure 12:
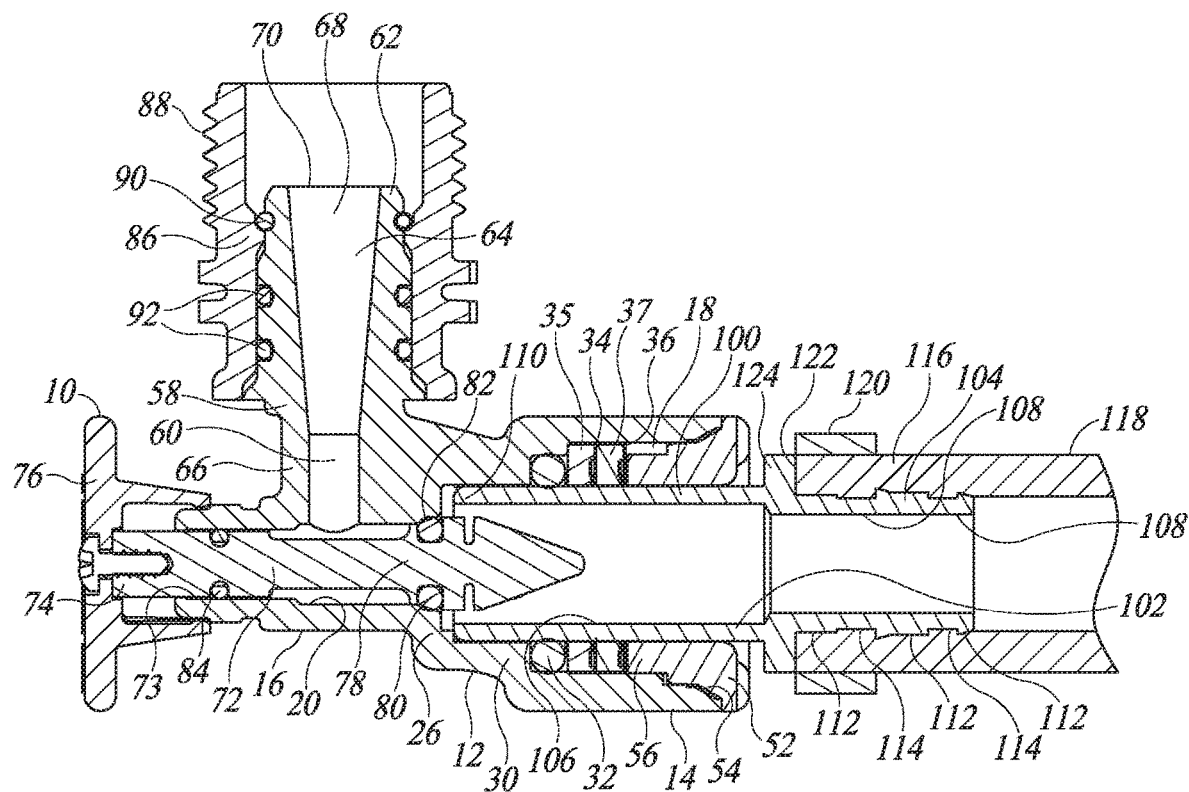
FIG. 12 is a cross-section side elevational view of the adapter of FIG. 5 used in combination with the valve of FIG. 1, with a PEX tubing connected to the adapter.

The second adapter end portion 104 has an outer surface with a series of annular rings 112, much like barbs, with recessed surfaces 114 between the annular rings. The second adapter end portion 104 serves as a fitting which can be inserted into a free-end portion 116 of an expanded PEX tubing 118 of the proper internal diameter and having a securement ring or collar 120 mounted thereon, as shown in FIG. 12. The second adapter end portion 104 is inserted into the free-end portion 116 of the tubing 118 until an end wall 122 of the free-end portion 116 engages a stop flange 124 of the second adapter end portion. The free-end portion 116 of the PEX tubing 118 with the securement ring 120 mounted thereon can be expanded using a conventional expander tool (not shown) before inserting the second adapter end portion 104. The second adapter end portion 104 provides a secure connection and fluid-tight seal between an inner wall of the PEX tubing 118 and the outer surface of the second adapter end portion 104. The adapter 100 is shown in FIG. 5A with the stop flange 124 included two opposing flat surfaces 125 for engagement with a wrench (not shown).

Figure 13:
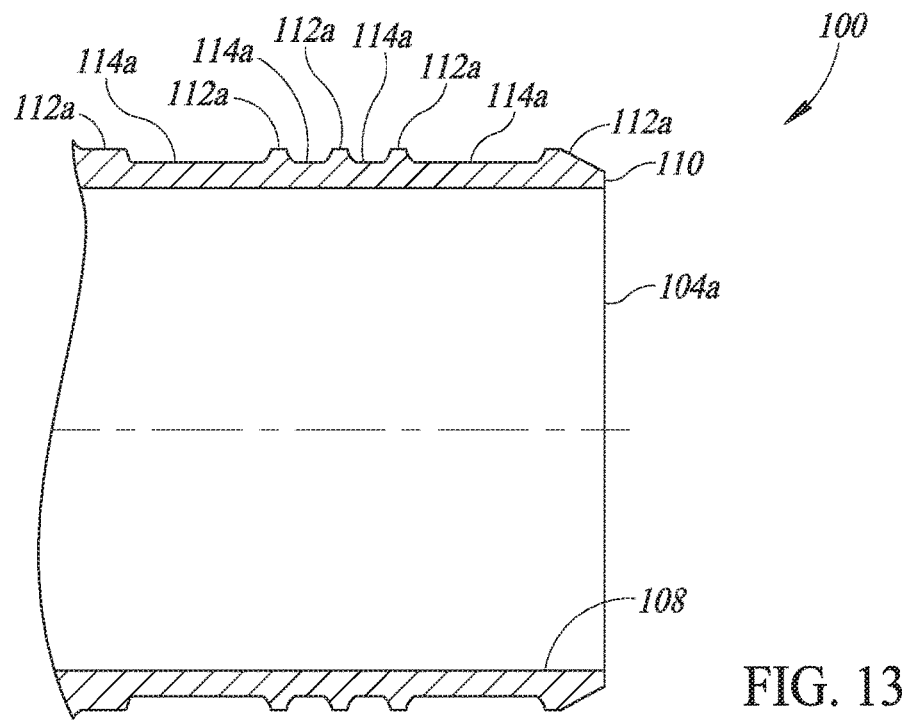
FIG. 13 is a cross-section side elevational view of the second adapter end portion of the adapter of FIG. 5 modified with rings (barbs) and recessed surfaces therebetween used for a crimp connection.

In a somewhat similar fashion, a PEX or PE-RT tubing may be connected to the second adapter end portion using a crimp ring which is appears much like the collar 120 except it is crimped using a conventional crimping tool to apply a radially inward force on the free-end portion 116 of the tubing to provide a secure connection and fluid-tight seal between an inner wall of the tubing and the outer surface of the second adapter end portion 104. When using a crimp connection, the rings (barbs) 112 and recessed surfaces 114 on the outer surface of the second adapter end portion 104 have a different shape and spacing, such as shown in the second adapter end portion 104a of FIG. 13 with crimp rings (barbs) 112a and recessed surfaces 114a.

While the illustrated valve 10 and adapter 100 is configured and sized for use with a washing machine, the valve and adapter may be configured and sized for other uses as mentioned above. In particular, the adapter 100 may be manufactured in a number of sizes, with the second adapter end portion 104 having a variety of different outer diameter sizes, each suitable for insertion into the free-end portion of a different internal diameter PEX or PE-RT tubing (such as ½, ⅝, ¾ and 1 inch sizes), but with each having the first adapter end portion 102 with the same shape and outer diameter size for insertion into the first axial bore 18 of the first housing portion 14 of the of the push-fit type valve 10. This provides the advantage of having to only manufacture and stock a single size and style push-fit type valve 10 since it can be used with adapters 100 having second adapter end portions 104 with different outer diameter sizes and shapes suitable for connection to different internal diameter size tubing using different manners of tubing connections, since each adapter will have the same outer diameter size of first adapter end portion 102 which can be inserted into the first axial bore 18 of the push-fit type valve and secured therein by the gripper rings 34 and 35 and with the O-ring 32 providing the fluid-tight seal between the outer wall of the first adapter end portion and the inner wall of the first axial bore 18.

Since the second adapter end portion 104 is inserted into the free-end portion 116 of the tubing 118, and the gripper rings 34 and 35 and the O-ring 32 engage the first adapter end portion 102, there is no need to use a stiffener sleeve inserted within the tubing for proper gripping by the gripper rings and a good seal by the O-ring of the coupling, hence use of the adapter 100 results in cost savings and reduced installation time.

With the availability of the adapter 100, the same size and style push-fit type valve 10 may be used without the adapter 100 for connection to rigid pipe 24 having an outer diameter sized to be engaged by the gripper rings 34 and 35 and sealed by the O-ring 32, and also may be used with the adapter for connection of a PEX or PE-RT tubing to the push-fit type valve. As such, the same push-fit type valve 10 may be used for connections to rigid pipes and to PEX and PE-RT tubing. Again, this provides the advantage of having to only manufacture and stock a single size and style push-fit type valve 10, but have it be usable for making a push-fit connection or a PEX or PE-RT tubing expansion or crimp connection, or any other style of tubing connection other than a push-fit connection.

One benefit of using the push-fit valve 10 (with the style most suitable) using a gripper ring with the arrangement described above is that conventional typical stop valve expansion or crimp application requires the plumber doing the initial tubing installation leave enough tubing at the stub out to be able to cut off the valve if it leaks and replace it with the same type of valve. The result is tubing that sticks way out of the wall gathering dirt and paint and sheet rocker's mud, which looks messy, unfinished, and industrial in a residential application. With use of the push-fit valve 10 and adapter 100, the plumber may make the stub out shorter and provide more of a flush looking application. The result is a clean finished look that is easy to maintain and replace.

Yet another advantage of using the push-fit valve 10 is that the push-fit connection using a gripper ring with the arrangement described above, allows for rotation of the valve relative to the adapter 100 which allows rotation of the valve as needed to better align the third housing portion 58 and the flexible supply hose to which it is connection for a more direct hose run to the washing machine, water tank, ice maker, dishwasher or other appliance or equipment to which the supply hose is to be connected, and hence minimize the need to bend the supply hose.

An additional benefit of using the push-fit valve 10 is that the push-fit connection using a gripper ring with the arrangement described above, allows the valve to be easily disconnected from the adapter 100 by simply unscrewing the valve from the first adapter end portion 102 while the second adapter end portion 104 stays connected to the PEX or PE-RT tubing so that the expansion or crimp connection is maintained. A new push-fit valve is simply then pushed onto the first adapter end portion 102. This makes replacing a leaking or damaged valve easy and inexpensive. With a conventional valve connected to PEX or PE-RT tubing by an expansion or crimp connection, to remove the valve requires the tubing to be cut to free the valve, which may leave a shorter exposed length of tubing where it exits a wall opening, and potentially making it difficult or impossible to connect a new valve. As discussed above, to avoid this problem with a conventional valve connected to PEX or PE-RT tubing by an expansion or crimp connection, the plumber doing the initial tubing installation must leave excess and unsightly tubing extending out of the wall.

Figure 14:
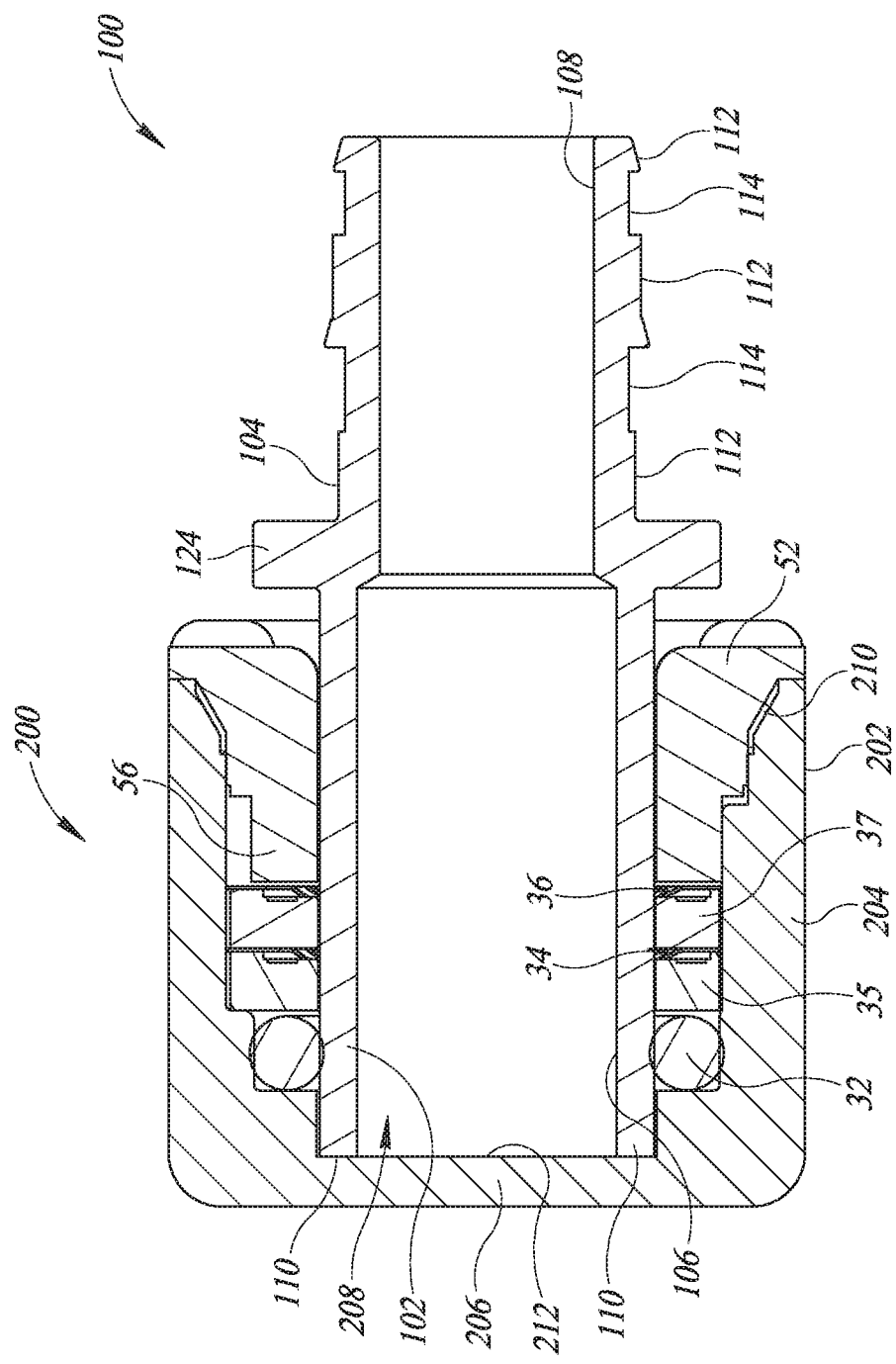
FIG. 14 is a cross-section side elevational view of a push-fit-fit test cap used in combination with the adapter of FIG. 5.

Another push-fit type fitting which may provide some of the same benefits is a test cap 200 using a similar push-fit connection and the adapter 100, as shown in FIG. 14. The test cap 200 includes a housing 202 with a circumferentially extending test cap sidewall portion 204 and a test cap end wall portion 206 closing one end of the test cap sidewall portion to define a test cap chamber or bore 208 with an outer open end portion 210 where the test cap bore is open. The test cap bore 208 is sized to receive therein, through the outer open end portion 210, the first adapter end portion 102. The outer end wall 110 of the first adapter end portion 102 engages an inner surface 212 of the test cap end wall portion 206 when inserted fully into the test cap bore to limit inward movement of the first adapter end portion and position the first adapter end portion in engagement with the teeth 44 of the first and second gripper rings 34 and 35 while extending through the O-ring 32.

Much as described above with respect to the push-fit valve 10, an advantage of the test cap 200 is that the push-fit connection using a gripper ring with the arrangement described above allows the test cap to be installed on the first adapter end portion 102 of the adapter 100 when the second end portion 104 is connected to a tubing, such as a PEX or PE-RT tubing, for pressurized testing of the plumbing system, and then easily disconnected from the first adapter end portion 102 by simply unscrewing the test cap while the second adapter end portion 104 stays connected to the PEX or PE-RT tubing so that the expansion or crimp connection is maintained. Then, with the pressurized system testing complete and the test cap 200 removed from the first adapter end portion 102, the push-fit valve 10 can be easily connected to the adapter 100 by simply pushing it onto the first adapter end portion 102. This makes pressurized system testing for leaks possible without having to cut off the test cap with the resulting loss of a length of the tubing which leaves a shorter exposed length of tubing where it exits a wall opening, and potentially making it difficult or impossible to connect a valve to it. Also, unlike when a test cap has to be cut off and is not reusable, the test cap 200 can be reused. This results in saving the time needed to cut off the test cap and install a new standard fitting for attaching a valve, and in saving the cost of purchasing and carrying in inventory a new test caps for each test to be conducted.

In addition to a valve and test cap, the adapter 100 may also be used with most other type fittings utilizing a push-fit connection employing a gripper ring when connecting to tubing.

The adapter 100 may be made from a non-corrosive polymer material such as polysulfone, 20% Glass-reinforced (½" to 1"), modified polyphenylsulfone (1¼" to 1½") or polyphenylsulfone (2" to 3"). Other suitable materials may be used, such as CPVC.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. A valve and adapter for coupling a free-end portion of a tubing having an inner wall portion to the valve, comprising:
   an adapter having a first adapter end portion with a cylindrical shaped first outer wall portion and a second adapter end portion with a second outer wall portion, the second outer wall portion being sized and shaped to be inserted into the free-end portion of the tubing to provide a secure connection with the tubing and a fluid-tight seal between the inner wall portion of the tubing and the second outer wall portion, the first adapter end portion having a first fluid passageway extending therethrough and the second adapter end portion having a second fluid passageway extending therethrough, the first fluid passageway having an outer end portion and an inward end portion and the second fluid passageway having an outer end portion and an inward end portion, the inward end portions of the first and second fluid passageways being in fluid communication;
   a valve housing having a first housing portion with a first chamber sized to receive the first adapter end portion therein and a second housing portion with a second chamber, the second chamber having an inward fluid port and an outer fluid port, when the first adapter end portion is positioned within the first chamber, the outer end portion of the first fluid passageway of the first adapter end portion and the outer end portion of the second fluid passageway of the second adapter end portion are in fluid communication with the inward fluid port of the second chamber;
   a seal located within the first chamber in fluid-tight engagement with the first housing portion and positioned for fluid-tight engagement with the first adapter end portion when positioned within the first chamber;
   a first gripper ring located within the first chamber, the first gripper ring including gripper teeth extending inwardly and in position for engagement with the first adapter end portion when positioned within the first chamber to resist unintentional removal of the first adapter end portion from the first chamber;
   a second gripper ring located within the first chamber outward of the first gripper ring, the second gripper ring including gripper teeth extending inwardly and in position for engagement with the first adapter end portion when positioned within the first chamber to resist unintentional removal of the first adapter end portion from the first chamber; and
   a valve element to selectively control fluid flow between the outer end portion of the first fluid passageway of the first adapter end portion and the inward fluid port of the second chamber.

2. The valve and adapter of claim 1, wherein the valve housing further includes a third housing portion with a third chamber, the third chamber having an inward fluid port and an outer fluid port, when the first adapter end portion is positioned within the first housing portion, the outer end portion of the first fluid passageway of the first adapter end portion is in fluid communication with the inward fluid port of the third chamber and the outer fluid port of the third chamber is in fluid communication with the inward fluid port of the second chamber, and wherein the valve element includes a stopper member and a movable valve stem to move the stopper member between a closed position blocking fluid flow between the inward fluid port of the first chamber and the inward fluid port of the second chamber and an opened position allowing fluid flow between the inward fluid port of the first chamber and the inward fluid port of the second chamber, the valve stem being at least partially positioned within the second chamber.

3. The valve and adapter of claim 2, wherein the second chamber has an opening through which the valve stem extends and the valve element includes a manually operable actuator attached to the valve stem outward of the second chamber and manually movable by a user to move the stopper member between the closed and opened positions.

4. The valve and adapter of claim 2, wherein the first chamber has an inward end portion in fluid communication with the inward fluid port of the second chamber, and the valve stem has an inward end portion extending through the inward fluid port of the second chamber and into the inward end portion of the first chamber.

5. The valve and adapter of claim 1, wherein the second outer wall portion of the second adapter end portion has at least one raised annular ring to engage the inner wall portion of the tubing when inserted into the free-end portion of the tubing to provide a secure connection of the second adapter end portion with the tubing.

6. The valve and adapter of claim 1, wherein the seal is an O-ring and the first chamber has a stop member positioned to be engaged by an end portion of the first adapter end portion when the first adapter end portion is positioned within the first chamber to limit inward movement of the first adapter end portion and position the first adapter end portion in engagement with the teeth of the first and second gripper rings and extending through the O-ring.

7. The valve and adapter of claim 1, wherein when the first adapter end portion is within the first chamber with the teeth of the first and second gripper rings in engagement with the first adapter end portion, the first and second gripper rings selectively permit removal of the first adapter end portion from the first chamber.

8. The valve and adapter of claim 7, wherein when the first adapter end portion is within the first chamber with the teeth of the first and second gripper rings in engagement with the first adapter end portion, the first and second gripper rings selectively permit removal of the first adapter end portion from the first chamber in response to rotation of the first adapter end portion relative to the first and second gripper rings.

9. The valve and adapter of claim 1, wherein when the first adapter end portion is positioned within the first chamber, the second adapter end portion extends outward of the first chamber beyond an outer end of the first chamber to position a portion of the second adapter end portion extending outward of the first chamber outer end exposed for insertion into the free-end portion of the tubing for providing the secure connection with the tubing and a fluid-tight seal between the inner wall portion of the tubing and the second outer wall portion of the second adapter end portion at a location outward of the first chamber.

10. The valve and adapter of claim 1, wherein the first chamber is sized to removably receive the first adapter end portion therein.

11. The valve and adapter of claim 1, wherein the teeth of the first and second gripper rings releasably engage the first adapter end portion when positioned within the first chamber.

12. The valve and adapter of claim 1, wherein the adapter includes a stop flange positioned between the first and second adapter end portions, the stop flange projecting outward to limit the depth of insertion of the second adapter end portion into the free-end portion of the tubing.

13. A valve and adapter for coupling a free-end portion of a tubing having an inner wall portion to the valve, comprising:
an adapter having a first adapter end portion with a cylindrical shaped first outer wall portion and a second adapter end portion with a second outer wall portion, the second outer wall portion being sized and shaped to be inserted into the free-end portion of the tubing to provide a secure connection with the tubing and a fluid-tight seal between the inner wall portion of the tubing and the second outer wall portion, the first adapter end portion having a first fluid passageway extending therethrough and the second adapter end portion having a second fluid passageway extending therethrough, the first fluid passageway having an outer end portion and an inward end portion and the second fluid passageway having an outer end portion and an inward end portion, the inward end portions of the first and second fluid passageways being in fluid communication;
a valve housing having a first housing portion with a first chamber sized to receive the first adapter end portion therein and a second housing portion with a second chamber, the second chamber having an inward fluid port and an outer fluid port, when the first adapter end portion is positioned within the first chamber, the outer end portion of the first fluid passageway of the first adapter end portion and the outer end portion of the second fluid passageway of the second adapter end portion are in fluid communication with the inward fluid port of the second chamber;
a seal located within the first chamber in fluid-tight engagement with the first housing portion and positioned for fluid-tight engagement with the first adapter end portion when positioned within the first chamber;
a gripper ring located within the first chamber, the gripper ring including gripper teeth extending inwardly and in position for engagement with the first adapter end portion when positioned within the first chamber to resist unintentional removal of the first adapter end portion from the first chamber; and
a valve element to selectively control fluid flow between the outer end portion of the first fluid passageway of the first adapter end portion and the inward fluid port of the second chamber.

14. The valve and adapter of claim 13, wherein the valve housing further includes a third housing portion with a third chamber, the third chamber having an inward fluid port and an outer fluid port, when the first adapter end portion is positioned within the first housing portion, the outer end portion of the first fluid passageway of the first adapter end portion is in fluid communication with the inward fluid port of the third chamber and the outer fluid port of the third chamber is in fluid communication with the inward fluid port of the second chamber, and wherein the valve element includes a stopper member and a movable valve stem to move the stopper member between a closed position blocking fluid flow between the inward fluid port of the first chamber and the inward fluid port of the second chamber and an opened position allowing fluid flow between the inward fluid port of the first chamber and the inward fluid port of the second chamber, the valve stem being at least partially positioned within the second chamber.

15. The valve and adapter of claim 14, wherein the second chamber has an opening through which the valve stem extends and the valve element includes a manually operable actuator attached to the valve stem outward of the second chamber and manually movable by a user to move the stopper member between the closed and opened positions.

16. The valve and adapter of claim 14, wherein the first chamber has an inward end portion in fluid communication with the inward fluid port of the second chamber, and the valve stem has an inward end portion extending through the inward fluid port of the second chamber and into the inward end portion of the first chamber.

17. The valve and adapter of claim 13, wherein the second outer wall portion of the second adapter end portion has at least one raised annular ring to engage the inner wall portion of the tubing when inserted into the free-end portion of the tubing to provide a secure connection of the second adapter end portion with the tubing.

18. The valve and adapter of claim 13, wherein the seal is an O-ring and the first chamber has a stop member positioned to be engaged by an end portion of the first adapter end portion when the first adapter end portion is positioned within the first chamber to limit inward movement of the first adapter end portion and position the first adapter end portion in engagement with the teeth of the gripper ring and extending through the O-ring.

19. The valve and adapter of claim 13, wherein when the first adapter end portion is within the first chamber with the teeth of the gripper ring in engagement with the first adapter end portion, the gripper ring selectively permits removal of the first adapter end portion from the first chamber.

20. The valve and adapter of claim 19, wherein when the first adapter end portion is within the first chamber with the teeth of the gripper ring in engagement with the first adapter end portion, the gripper ring selectively permits removal of the first adapter end portion from the first chamber in response to rotation of the first adapter end portion relative to the gripper ring.

21. The valve and adapter of claim 13, wherein when the first adapter end portion is positioned within the first chamber, the second adapter end portion extends outward of the first chamber beyond an outer end of the first chamber to position a portion of the second adapter end portion extending outward of the first chamber outer end exposed for insertion into the free-end portion of the tubing for providing the secure connection with the tubing and a fluid-tight seal between the inner wall portion of the tubing and the second outer wall portion of the second adapter at a location outward of the first chamber.

22. The valve and adapter of claim 13, wherein the first chamber is sized to removably receive the first adapter end portion therein.

23. The valve and adapter of claim 13, wherein the teeth of the first and second gripper rings releasably engage the first adapter end portion when positioned within the first chamber.

24. The valve and adapter of claim 13, wherein the adapter includes a stop flange positioned between the first and second adapter end portions, the stop flange projecting outward to limit the depth of insertion of the second adapter end portion into the free-end portion of the tubing.

25. An adapter for coupling a free-end portion of a tubing having an inner wall portion to a valve having a valve housing with a first housing portion having a first chamber and a second housing portion having a second chamber, the second chamber having an inward fluid port and an outer fluid port, a seal located within the first chamber in fluid-tight engagement with the first housing portion, a gripper ring located within the first chamber, the gripper ring including gripper teeth extending inwardly, and a valve element to selectively control fluid flow out of the outer fluid port of the second chamber, the adapter comprising:
  a first adapter end portion with a cylindrical shaped first outer wall portion sized to be received within the first chamber in fluid-tight engagement with the seal and in engagement with the teeth of the gripper ring to resist unintentional removal of the first adapter end portion from the first chamber, the first adapter end portion having a first fluid passageway extending therethrough, the first fluid passageway having an outer end portion and an inward end portion, the outer end portion of the first fluid passageway of the first adapter end portion being positioned to be in fluid communication with the inward fluid port of the second chamber of the second housing when the first adapter end portion is positioned within the first chamber; and
  a second adapter end portion with a second outer wall portion, the second outer wall portion being sized and shaped to be inserted into the free-end portion of the tubing to provide a secure connection with the tubing and a fluid-tight seal between the inner wall portion of the tubing and the second outer wall portion, the second adapter end portion having a second fluid passageway extending therethrough, the second fluid passageway having an outer end portion and an inward end portion, the inward end portions of the first and second fluid passageways being in fluid communication, the outer end portion of the second fluid passageway of the second adapter end portion being positioned to be in fluid communication with the inward fluid port of the second chamber of the second housing when the first adapter end portion is positioned within the first chamber.

26. The adapter of claim 25, wherein when the first adapter end portion is positioned within the first chamber, the second adapter end portion extends outward of the first chamber beyond an outer end of the first chamber to position a portion of the second adapter end portion extending outward of the first chamber outer end exposed for insertion into the free-end portion of the tubing for providing the secure connection with the tubing and a fluid-tight seal between the inner wall portion of the tubing and the second outer wall portion of the second adapter end portion at a location outward of the first chamber.

27. The adapter of claim 25, wherein the adapter is sized to be removably received within the first chamber.

28. The adapter of claim 25, wherein the first outer wall portion is releasably engageable with the teeth of the gripper ring when positioned within the first chamber.

29. The adapter of claim 25, wherein the adapter includes a stop flange positioned between the first and second adapter end portions, the stop flange projecting outward to limit the depth of insertion of the second adapter end portion into the free-end portion of the tubing.

* * * * *